US010572538B2

(12) United States Patent
Nagao

(10) Patent No.: US 10,572,538 B2
(45) Date of Patent: Feb. 25, 2020

(54) LATTICE FINALIZATION DEVICE, PATTERN RECOGNITION DEVICE, LATTICE FINALIZATION METHOD, AND COMPUTER PROGRAM PRODUCT

(71) Applicant: KABUSHIKI KAISHA TOSHIBA, Minato-ku, Tokyo (JP)

(72) Inventor: Manabu Nagao, Kanagawa (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 961 days.

(21) Appl. No.: 15/135,735

(22) Filed: Apr. 22, 2016

(65) Prior Publication Data

US 2016/0321550 A1 Nov. 3, 2016

(30) Foreign Application Priority Data

Apr. 28, 2015 (JP) ................................. 2015-092253

(51) Int. Cl.
*G06F 16/901* (2019.01)
*G10L 15/08* (2006.01)

(52) U.S. Cl.
CPC ........ *G06F 16/9024* (2019.01); *G10L 15/083* (2013.01)

(58) Field of Classification Search
CPC ...... G06K 9/6297; G06N 20/00; G06N 5/025; G06N 5/02; G06Q 30/02; G06Q 30/0248; G06Q 30/0255; G06Q 30/0267; G06Q 30/0269; G06Q 30/0273; G06Q 30/0261; B60B 33/001; B60B 33/0021; B60B 33/0028; B60B 33/0039; B60B 33/0049; B60B 33/0057; B60B 33/0068;
(Continued)

(56) References Cited

U.S. PATENT DOCUMENTS 5,268,990 A * 12/1993 Cohen .................... G09B 19/04
704/200
5,459,798 A * 10/1995 Bailey .................. G06K 9/6297
382/218
(Continued)

FOREIGN PATENT DOCUMENTS

JP 3577725 B2 3/1995
JP H07-114617 A 5/1995
(Continued)

OTHER PUBLICATIONS

Goel, Vaibhava et al.; Segmental Minimum Bayes-Risk Decoding for Automatic Speech Recognition; IEEE Transactions on Speech and Audio Processing, vol. 12, No. 3, May 2004. (Year: 2004).*
(Continued)

*Primary Examiner* — Stanley K. Hill
(74) *Attorney, Agent, or Firm* — Foley & Lardner LLP

(57) ABSTRACT

According to an embodiment, a lattice finalization device finalizes a portion of a lattice that is generated by pattern recognition with respect to a signal on a frame-by-frame basis in chronological order. The device includes a detector and a finalizer. The detector is configured to detect, as a splitting position, a frame in the lattice in which the number of nodes and passing arcs is equal to or smaller than a reference value set in advance. The finalizer is configured to finalize nodes and arcs in paths from a start node to the splitting position in the lattice.

17 Claims, 9 Drawing Sheets

(58) Field of Classification Search
CPC .............. B60B 33/0073; B60B 33/028; G10L 15/00–15/083; G10L 17/00–17/02
See application file for complete search history.

(56) References Cited

U.S. PATENT DOCUMENTS

| | | | |
|---|---|---|---|
| 6,393,398 | B1 | 5/2002 | Imai et al. |
| 7,240,003 | B2* | 7/2007 | Charlesworth ..... G06F 16/3343 704/254 |
| 7,711,561 | B2 | 5/2010 | Hogenhout et al. |
| 7,895,040 | B2 | 2/2011 | Sakai et al. |
| 8,275,730 | B2 | 9/2012 | Nagao |
| 8,311,825 | B2 | 11/2012 | Chen |
| 2005/0256713 | A1* | 11/2005 | Garg ..................... G06K 9/6297 704/256 |
| 2007/0143112 | A1* | 6/2007 | Yu ........................... G10L 15/08 704/257 |
| 2008/0126089 | A1* | 5/2008 | Printz .................... G06Q 30/02 704/235 |
| 2012/0017232 | A1* | 1/2012 | Hoffberg ................. G06N 7/06 725/13 |
| 2012/0046935 | A1 | 2/2012 | Nagao |
| 2013/0073503 | A1 | 3/2013 | Nagao |
| 2013/0073564 | A1 | 3/2013 | Nagao |
| 2013/0179158 | A1 | 7/2013 | Nakamura et al. |
| 2015/0178285 | A1 | 6/2015 | Nagao |
| 2015/0179166 | A1 | 6/2015 | Nagao |
| 2015/0179177 | A1 | 6/2015 | Nagao |
| 2015/0220074 | A1 | 8/2015 | Nagao |
| 2016/0086096 | A1 | 3/2016 | Nagao et al. |
| 2016/0155440 | A1 | 6/2016 | Nagao |

FOREIGN PATENT DOCUMENTS

| | | |
|---|---|---|
| JP | 2000-215273 A | 8/2000 |
| JP | 2001-092496 A | 4/2001 |
| JP | 4322815 B2 | 8/2005 |
| JP | 4241771 B2 | 1/2008 |
| JP | 4956334 B2 | 3/2009 |
| JP | 5008078 B2 | 4/2009 |
| JP | 5121650 B2 | 4/2010 |
| JP | 4977163 B2 | 10/2010 |
| JP | 2011-198126 A | 10/2011 |
| JP | 2013-065188 A | 4/2013 |
| JP | 2013-164572 A | 8/2013 |
| JP | 2015-121707 A | 7/2015 |
| JP | 2015-121708 A | 7/2015 |
| JP | 2015-121709 A | 7/2015 |
| JP | 2015-143800 A | 8/2015 |
| JP | 2016-061975 A | 4/2016 |
| JP | 2016-102947 A | 6/2016 |

OTHER PUBLICATIONS

Fu, Tak-chung et al.; A review on time series mining; Elsevier; Engineering Applications of Artificial Intelligence 24 (2011)164-181. (Year: 2011).*

Darkhovsky, B. S. et al.; New Approach to the Segmentation Problem for Time Series of Arbitrary Nature; Proceedings of the Steklov Institute of Mathematics, 2014, vol. 287, pp. 54-67. Pleiades Publishing, Ltd., 2014. (Year: 2014).*

O. Bezie and P. Lockwood, "Beam Search and Partial Traceback in the Frame-Synchronous Two-Level Algorithm (TLBS)", ICASSP '93, pp. II-511-II-514, 1993.

O. Segawa, K. Takeda and F. Itakura, "Continuous Speech Recognition Without End-point Detection", Technical Report of IEICE, NLC2000-44, SP2000-92 (Dec. 2000), pp. 101-106, 2000.

D. Lu, T. Nishimoto and N. Minematsu, "Decision of Response Timing for Incremental Speech Recognition with Reinforcement Learning", ASRU 2011, pp. 467-472, 2011.

D. Povey, M. Hannemann, G. Boulianne, L. Burget, A. Ghoshal, M. Janda, M. Karafiat, S. Kombrink, P. Motlicek, Y. Qian, K. Riedhammer, K. Vesely and N. T. Vu, "Generating Exact Lattices in the WFST Framework", ICASSP '12, pp. 4213-4216, 2012.

E. O. Selfridge, I. Arizmendi, P. A. Heeman and J. D. Williams, "Stability and Accuracy in Incremental Speech Recognition", SIGDIAL '11, pp. 110-119, 2011.

E. Thelen, "Long Term On-Line Adaptation for Large Vocabulary Dictation", ICSLP '96, pp. 2139-2142, 1996.

G. A. Fink, C. Schillo, F. Kummert and G. Sagerer, "Incremental Speech Recognition for Multimodal Interfaces", IECON '98, pp. 2012-2017, 1998.

H. Kojima, Y. Nankaku, A. Lee, K. Tokuda, "Ultra-Rapid Speech Recognition Based on Search Termination Using Confidence Scoring", IEICE Technical Report, SP2008-128 (Jan. 2009), pp. 13-18, 2009.

H. Ohno, H. Kojima, Y. Nankaku, A. Lee and K. Tokuda, "Evaluation of Successive Rapid Hypothesis Determination Algorithm for Continuous Word Recognition", IEICE Technical Report, NLC2010-21, SP2010-94 (Dec. 2010), pp. 77-82, 2010.

I. McGraw and A. Gruenstein, "Estimating Word-Stability During Incremental Speech Recognition", INTERSPEECH 2012, pp. 1018-1021, 2012.

J. Peckham, J. Green, J. Canning and P. Stephens, "LOGOS—A Real Time Hardware Continuous Speech Recognition System", ICASSP '82, pp. 863-866, 1982.

P. Brown, J. Spohrer, P. Hochschild and J. Baker: "Partial Traceback and Dynamic Programming", ICASSP '82, 1982, pp. 1629-1632.

R. Chamberlain and J. Bridle, "ZIP: A Dynamic Programming Algorithm for Time-Aligning Two Indefinitely Long Utterances", ICASSP '83, pp. 816-819, 1983.

T. Imai, A. Kobayashi, S. Sato and A. Ando, "Broadcast News Transcription System with a Progressive 2-Pass Decoder", Technical Report of IEICE, NLC99-6I, SP99-129 (Dec. 1999), pp. 85-90, 1999.

T. Imai, A. Kobayashi, S. Sato, H. Tanaka and A. Ando, "Progressive 2-Pass Decoder for Real-Time Broadcast News Captioning", ICASSP '00, pp. 1559-1562, 2000.

T. Imai, H. Tanaka, A. Ando and H. Isono, "Progressive Early Decision of Speech Recognition Result by Comparing Most Likely Word Sequences", The IEICE Transactions on Information and Systems (Japanese Edition), vol. J84-D-II, No. 9, pp. 1942-1949, 2001.

* cited by examiner

SPLITTING POSITION

RESIDUAL ELEMENT

SPLITTING POSITION

PATH HAVING BEST SCORE

```
1   while inputting signal
2     x ← get input
3     process 1 frame by x
4     if a condition T is satisfied
5       f_d ← find a dividing position
6       if f_d is valid
7         perform a selecting step by f_d
8         perform a deletion step by f_d
9         perform a decision step by f_d
10        perform a dividing step by f_d
11        output a decided lattice and delete it
```

```
101  E_w ← E
102  for each e ∈ E_w
103    q_p ← p(e)
104    for i from 1 to (t(n(e)) - t(p(e)) -1)
105      make a new node q
106      make a new arc e' such that p(e')=q_p, n(e')=q
107      t(q) ← t(p(e)) +i
108      Q ← Q ∪ {q}, E ← E ∪ {e'}, q_p ← q
109    make a new arc e' such that p(e')=q_p, n(e')=n(e), l(e')=l(e)
110    E ← (E\{e}) ∪ {e'}
```

LATTICE FINALIZATION DEVICE, PATTERN RECOGNITION DEVICE, LATTICE FINALIZATION METHOD, AND COMPUTER PROGRAM PRODUCT

CROSS-REFERENCE TO RELATED APPLICATION

This application is based upon and claims the benefit of priority from Japanese Patent Application No. 2015-092253, filed on Apr. 28, 2015; the entire contents of which are incorporated herein by reference.

FIELD

Embodiments described herein relate generally to a lattice finalization device, a pattern recognition device, a lattice finalization method, and a computer program product.

BACKGROUND

A pattern recognition device is known that performs pattern recognition of time-series signals of speech, and converts the signals into a label string. Moreover, a pattern recognition device is also known in which the intermediate recognition result prior to the finalization of a label string is held in the form of a lattice. In such pattern recognition devices, a completed lattice or a label string obtained from a completed lattice is output as the eventual recognition result. The label string obtained from a lattice can be a single label string on the best path from among the lattice paths, or can be N number of label strings from the best path to the N-th path (where N is an integer equal to or greater than 2) from among the lattice paths.

However, in such pattern recognition devices, the recognition result is output on completion of a lattice. Hence, longer the signals that are input, longer becomes the delay time between the input of the signals and the output of the recognition result.

DETAILED DESCRIPTION

According to an embodiment, a lattice finalization device finalizes a portion of a lattice that is generated by pattern recognition with respect to a signal on a frame-by-frame basis in chronological order. The device includes a detector and a finalizer. The detector is configured to detect, as a splitting position, a frame in the lattice in which the number of nodes and passing arcs is equal to or smaller than a reference value set in advance. The finalizer is configured to finalize nodes and arcs in paths from a start node to the splitting position in the lattice.

An exemplary embodiment is described below in detail with reference to the accompanying drawings. A pattern recognition device according to the embodiment aims to generate a lattice by performing pattern recognition with respect to signals that are input in chronological order, and to promptly finalize a portion of the generated lattice and output the finalized portion.

Figure 1:
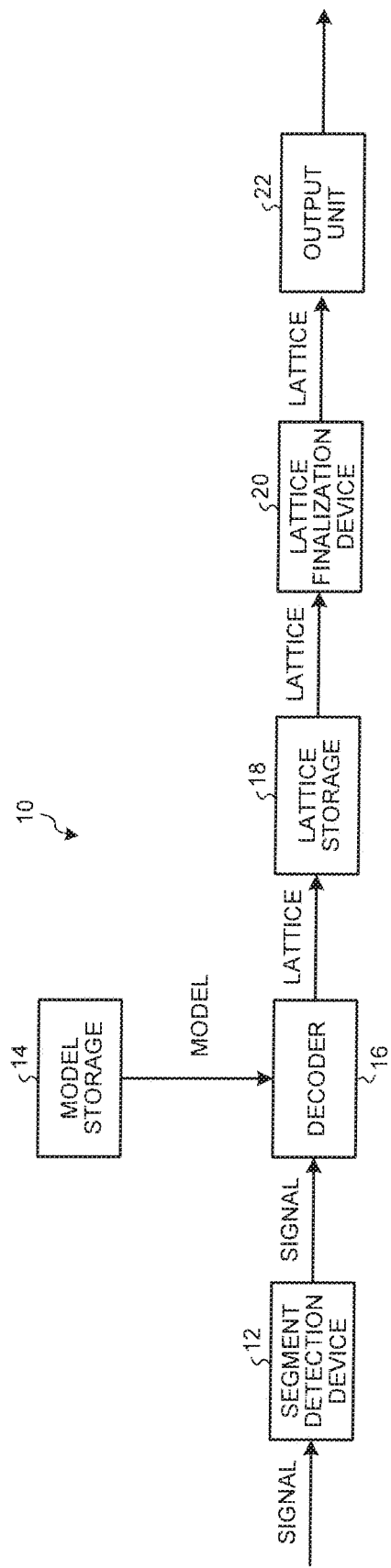
FIG. 1 is configuration diagram of a pattern recognition device.

FIG. 1 is diagram illustrating a configuration of a pattern recognition device 10. Herein, the pattern recognition device 10 includes a segment detection device 12, a model storage 14, a decoder 16, a lattice storage 18, a lattice finalization device 20, and an output unit 22.

The pattern recognizing device 10 receives input of signals in chronological order. As an example, speech signals, or handwriting signals representing characters, or moving image signals representing gestures are input in chronological order to the pattern recognition device 10. Herein, the pattern recognition device 10 is capable of performing pattern recognition, and can receive any type of signals as long as the signals can be input in chronological order.

The segment detection device 12 distinguishes between such segments in the input signals which need to be subjected to pattern recognition and such segments in the input signals which need not be subjected to pattern recognition. Then, the segment detection device 12 outputs, to the decoder 16, such signals from among the input signals which belong to the segments to be subjected to pattern recognition. For example, when speech signals are received as input, the segment detection device 12 can function as a speech segment detector (a voice activity detector) that clips speech segments except silent portions. As a result of installing the segment detection device 12 in the pattern recognition device 10, it becomes possible to eliminate unnecessary signal processing and to shorten the delay time between the input of signals to the output of the recognition result. However, alternatively, the pattern recognition device 10 may not include the segment detection device 12.

The model storage 14 is used to store a model with which the signals are matched for the purpose of pattern recognition. In the case of performing pattern recognition with respect to speech signals, the model storage 14 is used to store an acoustic model based on the hidden Markov model (HMM). Moreover, the model storage 14 can be used to store an acoustic model and a language model, and to store a model including a pronunciation dictionary.

The decoder 16 uses the model stored in the model storage 14 and uses a predetermined search algorithm, performs pattern recognition with respect to the input signals, and generates a lattice representing a plurality of label strings that come close to the patterns of the input signals. While the signals are being input in chronological order, the decoder 16 goes on performing pattern recognition in a sequential manner and goes on updating the lattice in a sequential manner.

For example, the decoder 16 generates a lattice according to a search algorithm called token passing. For example, in the case of performing pattern recognition with respect to speech signals, the decoder 16 generates a lattice representing the transition pattern of the states of the acoustic model based on the HMM. Alternatively, for example, the decoder 16 can generate a lattice representing the transition pattern of words (text strings) that are represented by the speech signals. Besides, for example, the decoder 16 can generate a lattice representing the transition pattern of phonemes or syllables.

The lattice storage 18 is used to store the lattice generated by the decoder 16. In the lattice storage 18, the stored lattice is sequentially updated along with the pattern recognition performed by the decoder 16.

The lattice finalization device 20 finalizes a portion of the lattice, which is stored in the lattice storage 18, at an early stage before completion of the lattice. For example, while the decoder 16 is performing pattern recognition, the lattice finalization device 20 serially finalizes the contents of portions starting from the temporally anterior side in the lattice. Herein, the lattice finalization device 20 can write, in a memory, information enabling identification of each finalized portion of the lattice, and can prohibit the decoder 16 from updating the finalized portion. Moreover, the lattice finalization device 20 can generate a new lattice by splitting the finalized portion from the non-finalized portion. Furthermore, the lattice finalization device 20 can output the new lattice obtained by splitting to the output unit 22 that is disposed at the subsequent stage, and can delete the already-output portion from the lattice storage 18.

The output unit 22 outputs the finalized lattice, which is finalized by the lattice finalization device 20, to the outside. Moreover, the output unit 22 can output the label string in the path that, in the finalized lattice, has the best score representing the degree of coincidence with the signals. Alternatively, the output unit 22 can output the label string in each of N number of paths having the N best scores in the finalized lattice. Furthermore, the output unit 22 can output a graph formed by processing the finalized lattice. For example, the output unit 22 can output a graph representing the best path, or a graph representing the N best paths, or a graph from which unnecessary paths are deleted, or a confusion network.

Meanwhile, the pattern recognition device 10 can also include a feature extraction device at the stage prior to the decoder 16. The feature extraction device extracts a feature value that represents the feature of the signals. In this case, the decoder 16 receives input of signals representing the feature value in chronological order, and performs pattern recognition with respect to the signals.

Figure 2:
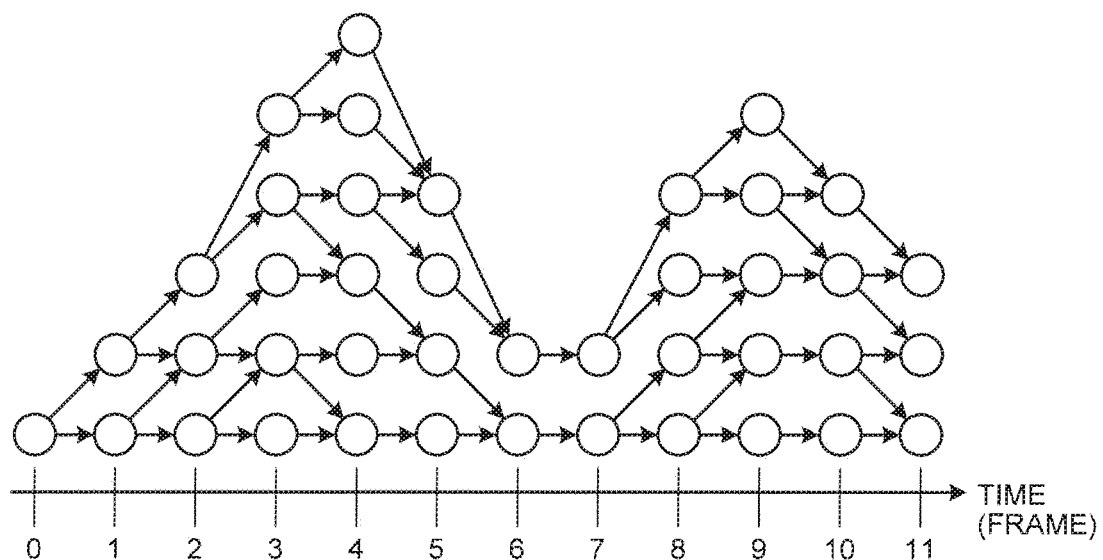
FIG. 2 is a diagram illustrating an exemplary lattice generated by a decoder.

FIG. 2 is a diagram illustrating an exemplary lattice generated by the decoder 16. Herein, the decoder 16 generates a lattice by performing pattern recognition with respect to the signals in each frame representing time. For example, the frames represent times at regular intervals. Moreover, for example, the frames are identified by frame numbers that are assigned in ascending order.

The lattice generated by the decoder 16 represents a directed acyclic graph including nodes and arcs. In the drawings, the nodes are illustrated as circles, and the arcs are illustrated as arrows.

A node represents the state of a signal at a particular time. Each node has time information (in the embodiment, a frame number) associated thereto. An arc represents the transition between nodes. That is, an arc represents the transition from a state of the signal at a particular time (i.e., from a node) to another state (node) at another time. Each arc has the immediately preceding node and the immediately following node associated thereto.

Since the lattice generated by the decoder 16 is a directed acyclic graph, the frame of the immediately preceding node is temporally anterior than the frame of the immediately following node. Moreover, in the lattice generated by the decoder 16, any node can have a plurality of incoming arcs, and any node can have a plurality of outgoing arcs.

Meanwhile, in a lattice, either it is the nodes or the arcs that have labels assigned thereto, or it is the nodes and the arcs that have labels assigned thereto. A label can represent an HMM state, a text, a word, a phoneme, or a syllable. Moreover, a label can also include a blank ($\varepsilon$).

Moreover, in a lattice, either it is the nodes or the arcs that have scores assigned thereto representing the degrees of coincidence with the signals, or it is the nodes and the arcs that have scores assigned thereto. In a particular period of time, the cumulative value of the scores in a path from the start node to the end node represents the degree of coincidence between the pattern of signals in that period of time and the label string in that path. In a particular period of time, the path in which the cumulative score is, for example, the maximum or the minimum represents the best path in that period of time.

As an example, the decoder 16 generates a lattice in which all arcs represent the transition between the nodes of two successive frames as illustrated in FIG. 2. A lattice representing the transition of HMM states is a lattice as illustrated in FIG. 2, for example. Such a lattice is also called a state lattice.

Alternatively, the decoder 16 can generate a lattice that includes arcs representing the transition between the nodes of two frames over a wider range than two successive frames. Such a lattice is also called a word lattice. The explanation about a word lattice is given later with reference to FIG. 11.

Figure 3:
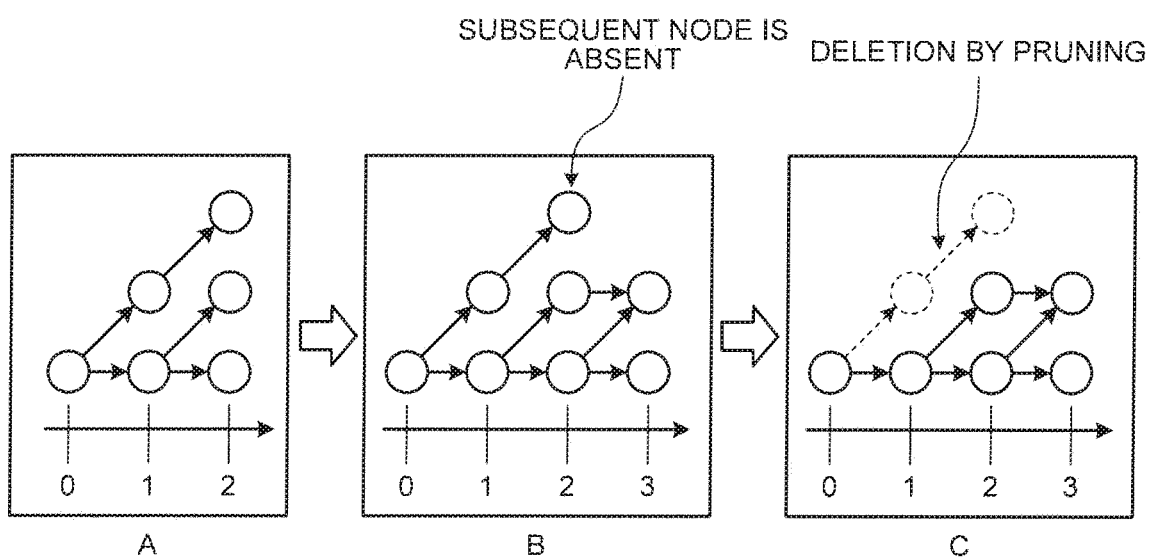
FIG. 3 is a diagram for explaining a pruning operation performed by the decoder.

FIG. 3 is a diagram for explaining a pruning operation performed by the decoder 16. The decoder 16 performs frame-by-frame pattern recognition with respect to the signals, and adds the nodes and the arcs that are obtained as a result of pattern recognition to the lattice stored in the lattice storage 18. Moreover, every time a predetermined condition is satisfied (for example, at regular intervals), the decoder 16 performs a pruning operation with respect to the lattice stored in the lattice storage 18, and deletes the paths that do not lead to the end. Moreover, the decoder 16 can also delete the paths having unfavorable cumulative scores.

For example, assume that pattern recognition performed up to the frame having the frame number 2 results in the generation of lattice illustrated in A in FIG. 3. Moreover, assume that, in the next frame having the frame number 3, the decoder 16 updates the lattice as illustrated in B in FIG. 3, for example. In the lattice illustrated in B in FIG. 3, there exists a path in which the node added in the frame having the frame number 2 is not connected to any node in the frame having the frame number 3. Such a path is highly likely to be redundant in the subsequent pattern recognition, and comes into existence because the decoder 16 does not add nodes and arcs continuous with that path.

In that regard, the decoder 16 performs a pruning operation and deletes, from the lattice, the nodes and the arcs that do not lead to the end. Moreover, it is also possible to delete the nodes and the arcs of the paths having unfavorable cumulative scores. As a result, the decoder 16 can reduce the amount of calculation required later and increase the amount of space available in the lattice storage 18. Meanwhile, when a lattice is not a state lattice, even if a node at the frame number 2 is not connected to any node at the frame number 3, there is a possibility that the node at the frame number 2 is connected to a node at a latter frame number. Hence, a path cannot be deleted only according to the condition that the nodes of neighboring frames are not connected. However, generally, for the purpose of adding nodes and arcs at appropriate positions in a lattice, the decoder has the understanding of the paths being searched. Thus, the decoder can identify the paths for which it is determined not necessary to proceed with the search. Hence, even when a lattice is not a state lattice, the decoder 16 can perform the pruning operation.

Figure 4:
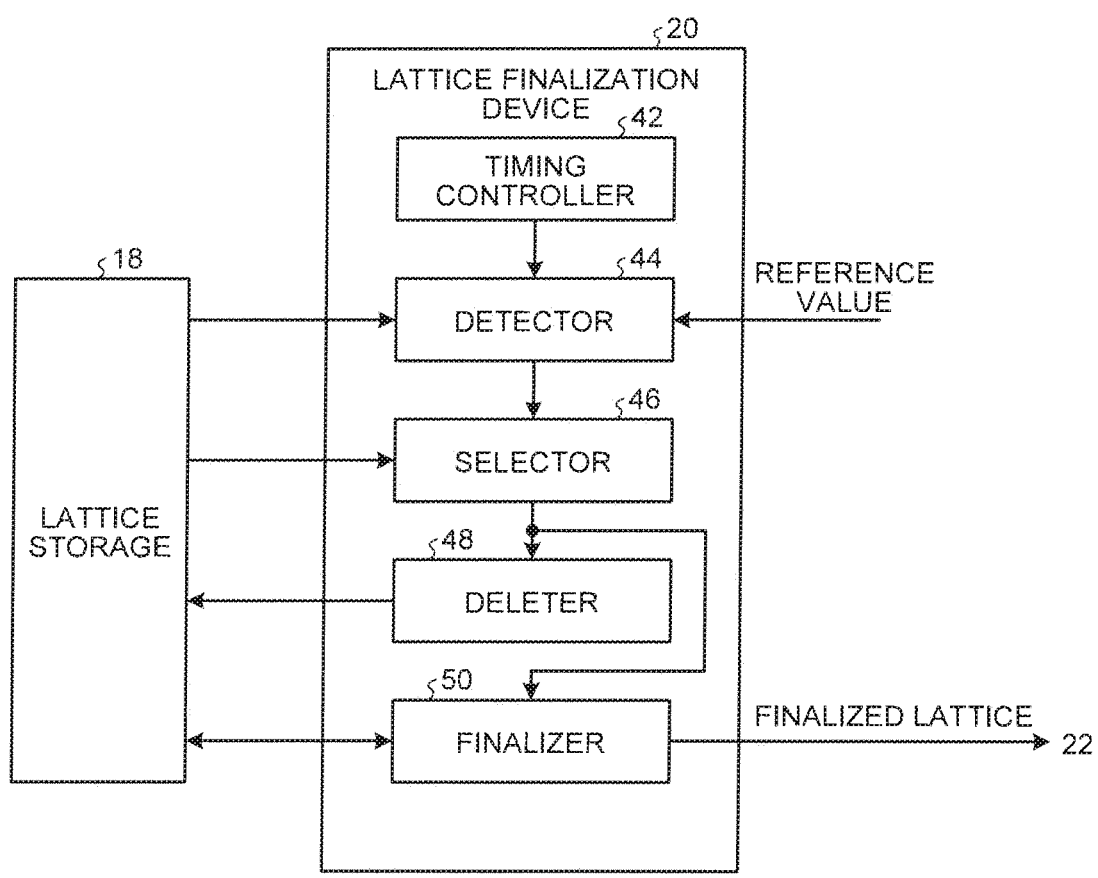
FIG. 4 is a diagram illustrating a configuration of the lattice finalization device.

FIG. 4 is a diagram illustrating a configuration of the lattice finalization device 20 along with illustrating the lattice storage 18. The lattice finalization device 20 includes a timing controller 42, a detector 44, a selector 46, a deleter 48, and a finalizer 50.

The timing controller 42 determines the timing for performing the operation of finalizing a portion of a lattice. More particularly, the timing controller 42 ensures that the operation of finalizing a portion of a lattice is performed while the decoder 16 is performing pattern recognition.

For example, the timing controller 42 ensures that the operation of finalizing a portion of the lattice is performed at regular intervals during the pattern recognition being performed by the decoder 16. Moreover, as an example, the timing controller 42 ensures that the operation of finalizing a portion of the lattice is performed at the time of performing the pruning operation during the pattern recognition being performed by the decoder 16. As a result, the timing controller 42 ensures that the operation of finalizing a portion is performed at a timing at which the nodes and the arcs in the lattice are small in number. Hence, it becomes possible to reduce the amount of calculation required for the finalization operation, and to enhance the possibility of finalizing a portion.

Moreover, as an example, the timing controller 42 can ensure that the operation of finalizing a portion of the lattice is performed when the number of paths included in the lattice becomes equal to or smaller than a certain value. With that too, it becomes possible to reduce the amount of calculation required for the finalization operation, and to enhance the possibility of finalizing a portion.

Furthermore, as an example, the timing controller 42 can ensure that the operation of finalizing a portion of the lattice is performed when a predetermined number of frames have passed since the frame of the start node of the lattice and when the number of paths in the lattice becomes equal to or smaller than a certain value. Meanwhile, during the period of time in which the frame-by-frame number of nodes undergoes a monotonic increase, the timing controller can prohibit the operation of finalizing a portion of the lattice. In the period of time closer to the start node, generally the number of paths goes on increasing in a gradual manner. Hence, if the lattice is separated during that period of time, then it becomes likely that an accurate recognition result is not obtained.

The timing controller 42 instructs the detector 44 to perform the operation of finalizing a portion of the lattice. Then, the detector 44 starts operations in response to the instruction from the timing controller 42.

The detector 44 detects, as the splitting position, such a single frame in the lattice, which is stored in the lattice storage 18, in which the number of nodes and the number of passing arcs is equal to or smaller than a reference value. Herein, an arc passing through a particular frame represents the arc for which the immediately preceding node is the node of the frame that is temporally anterior than the concerned frame and for which the immediately following node is the node of the frame that is temporally posterior than the concerned frame.

For example, when the lattice generated by the decoder 16 is a state lattice (i.e., a lattice in which all arcs represent the transition between the nodes of two successive frames); the detector 44 detects, as the splitting position, a single frame having the number of nodes equal to or smaller than the reference value. Alternatively, when the lattice generated by the decoder 16 is a word lattice (i.e., a lattice including arcs representing the transition between the nodes of two frames over a wider range than two successive frames); the detector 44 detects, as the splitting position, a single frame in which the number of nodes and the number of passing arcs add up to be equal to or smaller than the reference value.

Still alternatively, in the lattice stored in the lattice storage 18, from the start node to the end node, when there is more than one frames in which the number of nodes and the number of passing arcs is equal to or smaller than the reference value; the detector 44 detects, as the splitting position, the most temporally posterior frame from among the frames, for example. With that, the detector 44 can finalize the nodes and the arcs in a manner that enables achieving reduction in the period of time from the input of signals to the finalization.

Still alternatively, when there is more than one frames in which the number of nodes and passing arcs is equal to or smaller than the reference value; the detector 44 can detect, as the splitting position, the frame having the smallest number of nodes and passing arcs from among the frames, for example. With that, the detector 44 can finalize the nodes and the arcs in a manner that enables achieving a more accurate recognition result.

Still alternatively, the detector 44 can detect, as the splitting position, a frame positioned after a predetermined number of frames from the start node in the lattice stored in the lattice storage 18. That is, the detector 44 can prohibit detection of any frame before a predetermined number of frames from the start node as the splitting position. Moreover the detector 44 can prohibit detection of any frame during the period of time when the frame-by-frame number of nodes undergoes a monotonic increase as the splitting position. In the period of time closer to the start node, generally the number of paths goes on increasing in a gradual manner. Hence, if the lattice is separated during that period of time, then it becomes likely that an accurate recognition result is not obtained.

The detector 44 notifies the selector 46 about the detected splitting position. Then, the selector 46 starts operations in response to receiving a notification from the detector 44.

The selector 46 selects, from among the node at the splitting position or the arcs passing through the splitting position, at least a single node or a single arc as a residual element. More particularly, when the lattice generated by the decoder 16 is a state lattice, the selector 46 selects at least a single node at the splitting position as the residual element.

Alternatively, for example, when the lattice generated by the decoder 16 is a word lattice, the selector 46 selects, as the residual elements, at least a single node at the splitting position or a single arc passing through the splitting position.

As an example, the selector 46 selects, as the residual elements, either the nodes at the splitting position or the arcs passing through the splitting position. As a result, when the lattice is split at the splitting position, it becomes possible to have a single node serving as the connection node with the temporally anterior lattice and to have a single node serving as the connection node with the temporally posterior lattice. Meanwhile, alternatively, the selector 46 can select all nodes at the splitting position and all arcs passing through the splitting position as the residual elements.

Herein, while selecting the residual elements, the selector 46 can implement any algorithm as long as a more accurate recognition can be output and the residual elements can be selected within an appropriate range of the amount of calculation.

For example, from among a plurality of paths from the start node to the end node in the lattice stored in the lattice storage 18, the selector 46 detects at least a single path in sequence starting from the path having the best score that represents the degree of coincidence with the signals. Then, the selector 46 can select, as the residual elements, the nodes at the splitting position or the arcs passing through the splitting position in at least a single path that is detected. With that, the selector 46 can select, as the residual elements, such nodes or arcs that are more likely to lead to a more accurate recognition result at the present moment.

Alternatively, for example, from among a plurality of paths from the start node to the splitting position in the lattice stored in the lattice storage 18, the selector 46 detects at least a single path in sequence starting from the path having the best score. Then, the selector 46 can select, as the residual elements, the nodes at the splitting position or the arcs passing through the splitting position in at least a single path that is detected. With that, the selector 46 can select the residual elements with a relatively lower amount of calculation.

Still alternatively, for example, from among a plurality of paths from the start node to a specified frame from among the frames between the splitting position and the end node in the lattice stored in the lattice storage 18, the selector 46 detects at least a single path in sequence starting from the path having the best score. Then, the selector 46 can select, as the residual elements, the nodes at the splitting position or the arcs passing through the splitting position in at least a single path that is detected. With that, the selector 46 can select, as the residual elements, such nodes or arcs that are more likely to lead to a more accurate recognition result in a relatively smaller range of the amount of calculation.

Still alternatively, for example, from among the nodes at the splitting position or the arcs passing through the splitting position, the selector 46 detects a single node or a single arc in descending order of paths having the most number of branches up to the one or more end nodes. Then, the selector 46 can select, as the residual element, a single node or a single arc that is detected. With that, the selector 46 can select, as the residual elements, such nodes or arcs that are more likely to lead to a more accurate recognition result in a lower amount of calculation than calculating the scores.

Then, the selector 46 notifies the deleter 48 and the finalizer 50 about the selected residual elements. The deleter 48 starts operations in response to receiving a notification from the selector 46.

From the lattice stored in the lattice storage 18, the deleter 48 deletes the nodes and the arcs that are not selected as the residual elements at the splitting position, as well as deletes such nodes and arcs in the temporally anterior frame with respect to the splitting position which do not reach the residual elements. Moreover, from the lattice stored in the lattice storage 18, the deleter 48 can delete such nodes and arcs in the temporally posterior frame with respect to the splitting position which do not arrive from the residual elements. With that, the deleter 48 can secure a larger amount of space available in the lattice storage 18 and thus enable the decoder 16 to use the lattice storage 18 in an efficient manner.

Meanwhile, the deleter 48 may delete the nodes and the arcs at the splitting position and the nodes and the arcs that are temporally anterior to the splitting position, but may not delete the nodes and the arcs that are temporally posterior to the splitting position. As a result, the deleter 48 can at least delete the unnecessary nodes and arcs included in the range of finalization. Moreover, instead of performing the deletion every time the operation of finalizing a portion of a lattice is performed, the deleter 48 can perform the deletion after every plurality of number of times of the operation of finalizing a portion of a lattice. Furthermore, in the pattern recognition device 10, if the decoder 16 is configured to delete the unnecessary nodes and arcs by performing the pruning operation, the deleter 48 may not be disposed.

The finalizer 50 starts the operations in response to receiving a notification from the selector 46. The finalizer 50 finalizes the nodes and the arcs in the paths from the start node to the splitting position in the lattice stored in the lattice storage 18. When the residual element is a node, the finalizer 50 finalizes the nodes and the arcs in a plurality of paths from the start node to the residual element. When the residual element is an arc, the finalizer 50 finalizes the nodes and the arcs in a plurality of paths from the start node to either the immediately preceding node to the residual element or the immediately following node to the residual element. Moreover, when the residual element is an arc, if the finalizer 50 finalizes the nodes and the arcs in a plurality of paths from the start node to the immediately following node to the residual element, a greater number of nodes and arcs can be finalized at an early stage.

As an example, the finalizer 50 registers information about finalization targets in a memory so as to enable identification of the nodes and the arcs that are finalized in the lattice stored in the lattice storage 18. As a result, the finalizer 50 can prohibit updating of the nodes and the arcs finalized by the decoder 16, and can exclude the finalized nodes and arcs from the upcoming operations.

Meanwhile, the finalizer 50 can separate the finalized nodes and arcs into a new lattice isolated from the un-finalized nodes and arcs. In that case, the finalizer 50 newly registers the start node in the un-finalized lattice. Moreover, in this case, regarding the outgoing arcs from the node corresponding to the end node in the finalized new lattice, the finalizer 50 sets the corresponding immediately preceding node to be the newly-registered start node. As a result, the finalizer 50 can store two lattices, namely, the already-finalized new lattice and the un-finalized lattice in the lattice storage 18. Meanwhile, while separating the lattice, instead of newly registering the start node of the un-finalized lattice, the end node of the finalized lattice can be newly registered.

Moreover, the finalizer 50 can output the new lattice, which has been separated and already finalized, to the output unit 22. As a result, the output unit 22 can output the already-finalized lattice to the outside, and can output label strings based on the already-finalized lattice. After outputting the already-finalized new lattice, the finalizer 50 can delete that new lattice from the lattice storage 18. Thus, by deleting the already-output lattice, the finalizer 50 can increase the amount of space available in the lattice storage 18.

Meanwhile, the detector 44 receives, for example, the user setting of the reference value from the user. When the reference value is large, it is more likely that the splitting position can be detected. Thus, larger the reference value, the earlier it becomes possible for the lattice finalization device 20 to finalize a portion of the lattice. In fact, when the reference value is large, it has a large impact on the recognition operation performed at a subsequent stage. Thus, if the recognition result regarding the finalized portion is not correct, it is likely that the recognition operation at a subsequent stage becomes inaccurate.

In contrast, when the reference value is small, it has only a small impact on the recognition operation performed at a subsequent stage. Thus, even if the recognition result regarding the finalized portion is not correct, it is likely that the recognition operation at a subsequent stage becomes accurate. In fact, when the reference value is small, chances are small that the splitting position can be detected. Thus, when the reference value is small, a portion of the lattice cannot be finalized at an early stage. In that regard, it is desirable that the reference value is appropriately set by taking into account the balance between the demand for the recognition rate and the demand for an early output.

Meanwhile, when the demand for an early output is the most pressing demand, the detector 44 can set the splitting position in the lattice at regular time intervals regardless of the number of nodes and the number of passing arcs. In that case, the detector 44 is configured not to have the reference value set therein.

Figure 5:
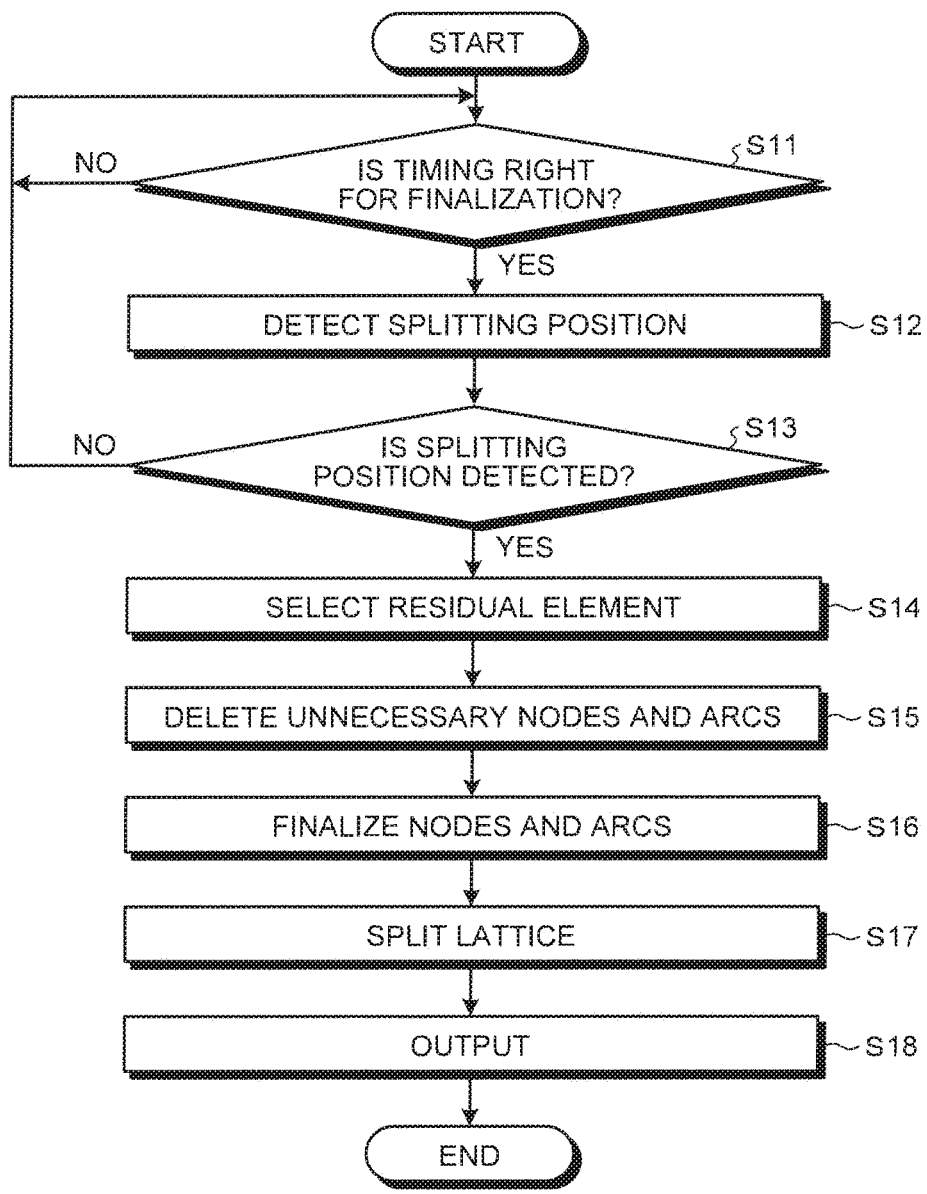
FIG. 5 is a diagram for explaining a flow of operations performed by the lattice finalization device.

FIG. 5 is a diagram for explaining a flow of operations performed by the lattice finalization device 20. FIGS. 6 to 10 are diagrams illustrating exemplary operational details of the lattice finalization device 20 with respect to a state lattice. The lattice finalization device 20 performs operations according to the flowchart illustrated in FIG. 5.

Firstly, at Step S11, the timing controller 42 determines whether or not the timing is right for finalization of a portion of the lattice. If the timing controller 42 determines that the timing is not right for finalization (No at Step S11), the system control stays put at Step S11. When the timing controller 42 determines that the timing is right for finalization (Yes at Step S11), the system control proceeds to Step S12.

Then, at Step S12, the detector 44 detects the splitting position of the lattice stored in the lattice storage 18. For example, if a state lattice as illustrated in FIG. 6 is stored in the lattice storage 18, the detector 44 detects a single frame having the number of nodes equal to or smaller than a reference value as the splitting position.

Figure 6:
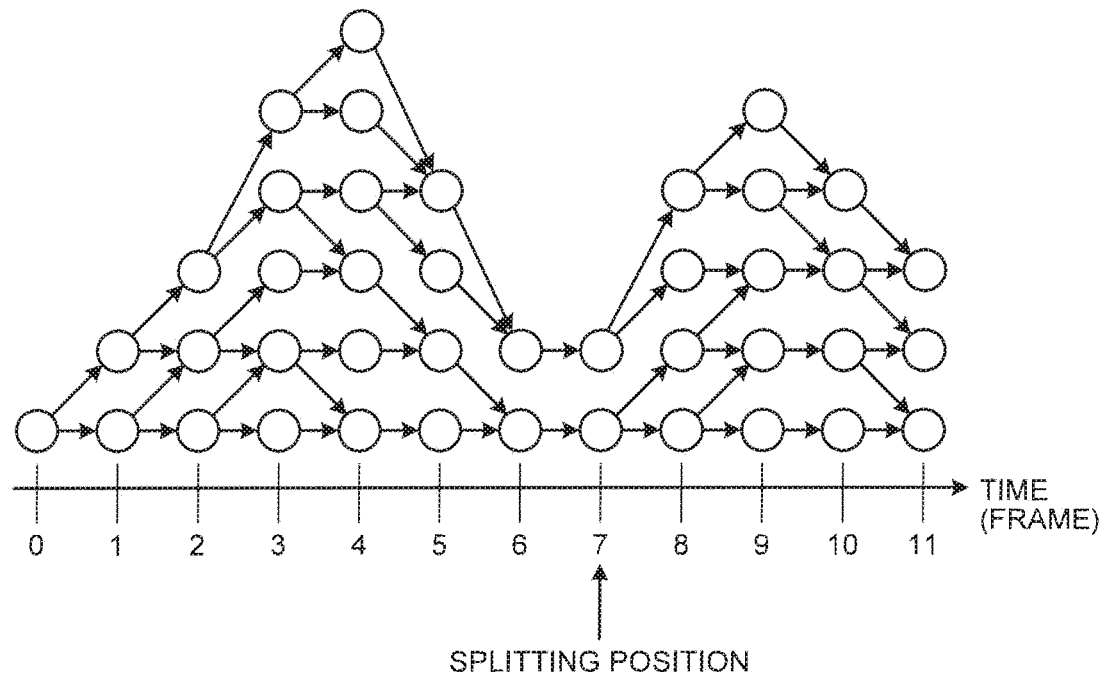
FIG. 6 is a diagram illustrating an exemplary splitting position in a lattice.

For example, in the state lattice illustrated in FIG. 6, starting from the frame having the frame number 0, the frames have the number of nodes equal to 1, 2, 3, 5, 6, 4, 2, 2, 4, 5, 4, and 3. For example, if the reference value is set to 2, then the frames having the frame numbers 0, 1, 6, and 7 represent the frames in which the number of nodes is equal to or smaller than the reference value.

In this example, the detector 44 detects, as the splitting position, a frame positioned after a predetermined number of frames from the start node. In this case, for example, if two is the predetermined number of frames, then the detector 44 prohibits detection of the frame numbers 0 and 1 as the splitting position. Thus, the detector 44 detects either the frame number 6 or the frame number 7 as the splitting position.

Moreover, in the present example, when there is more than one frame in which the number of nodes from the start node to the end node is equal to or smaller than the reference value, the detector 44 detects the most temporally posterior frame as the splitting position. Thus, in the present example, the detector 44 detects the frame having the frame number 7 as the splitting position.

Then, at Step S13, the detector 44 determines whether or not the splitting position was detected. If the splitting position was not detected (No at Step S13), then the system control returns to Step S11. On the other hand, when the splitting position was detected (Yes at Step S13), the system control proceeds to Step S14.

Figure 7:
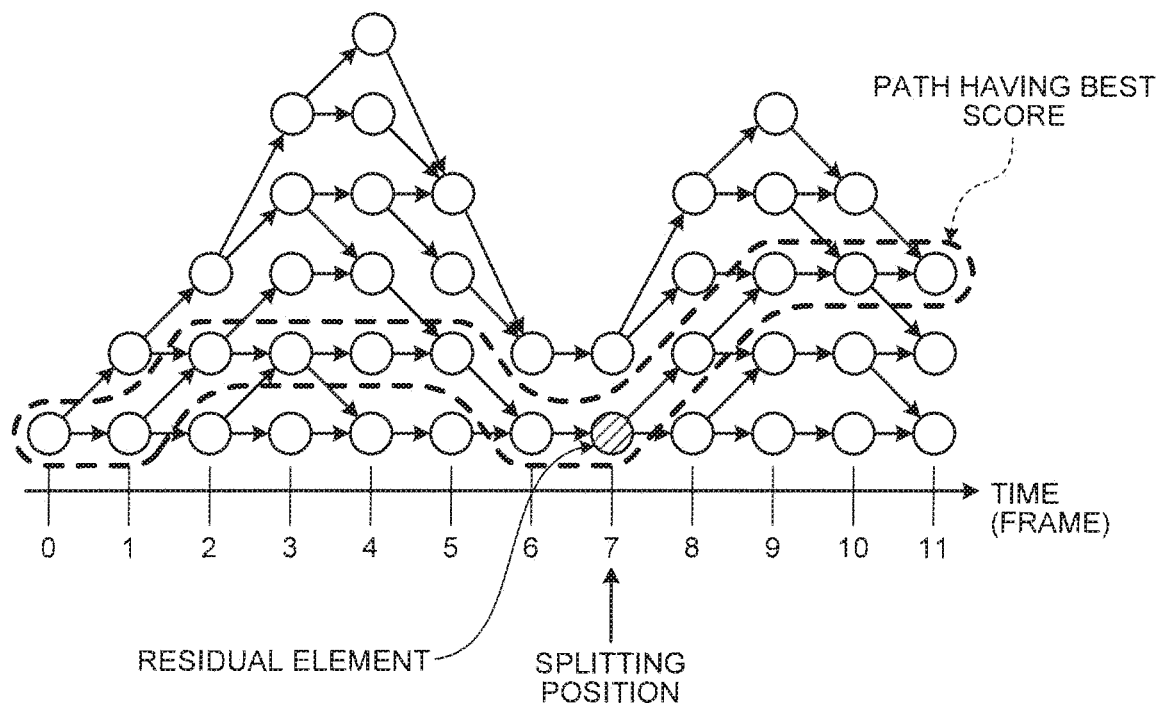
FIG. 7 is a diagram illustrating an exemplary residual element in the lattice.

At Step S14, from among the nodes at the splitting position or the arcs passing through the splitting position, the selector 46 selects at least a single residual element. In the present example, since a state lattice is stored in the lattice storage 18, the selector 46 selects a single node at the splitting position as the residual element. More particularly, as illustrated in FIG. 7, from among a plurality of paths from the start node (the frame number 0) to the end node (the frame number 11), the selector 46 detects the path having the best score that represents the degree of coincidence with the signals. Then, the selector 46 selects, as the residual element, the node at the splitting position (the frame number 7) in the single detected path.

Figure 8:
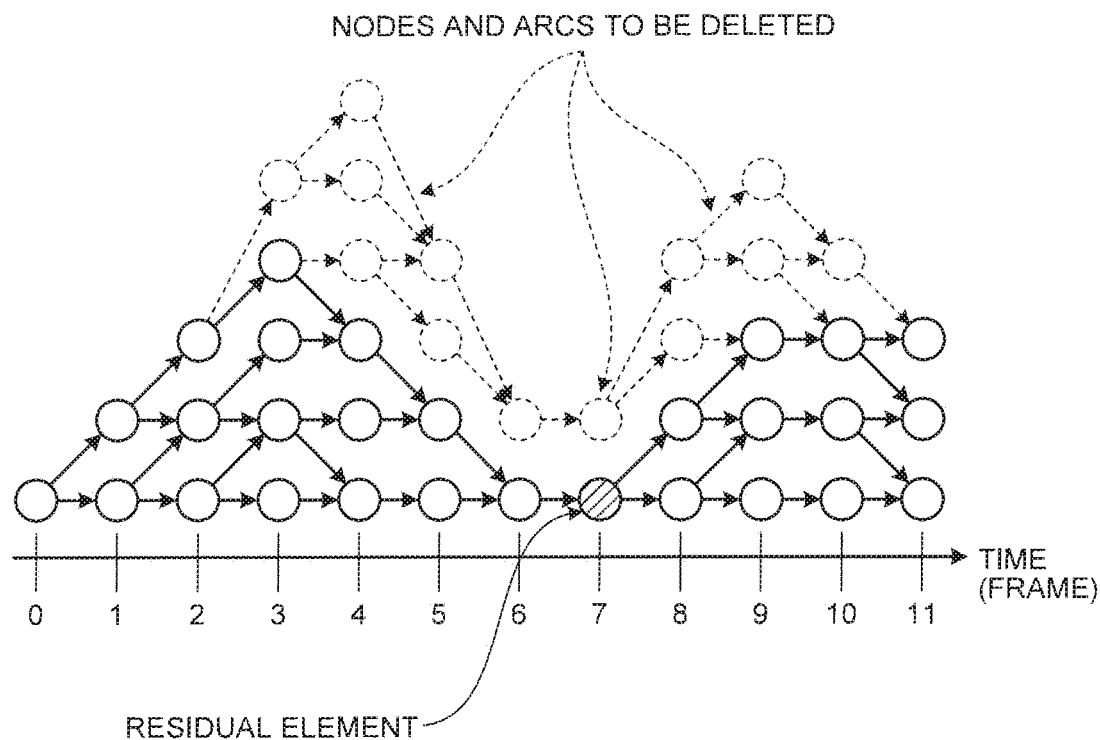
FIG. 8 is a diagram illustrating an example of nodes and arcs deleted from the lattice.

Subsequently, at Step S15, the deleter 48 deletes the unnecessary nodes and arcs from the lattice stored in the lattice storage 18. In the present example, as illustrated in FIG. 8, the deleter 48 deletes the nodes other than the residual element at the splitting position (the frame number 7). Moreover, the deleter 48 deletes such nodes and arcs in the temporally anterior frame (having the frame number 6) with respect to the splitting position which do not reach the residual element (i.e., deletes the nodes and arcs that reach only the nodes other than the residual element). Moreover, the deleter 48 deletes such nodes and arcs in the temporally posterior frames (having the frame numbers 8 to 11) with respect to the splitting position which do not arrive from the residual element (i.e., deletes the nodes and arcs that arrive only from the nodes other than the residual element).

Figure 9:
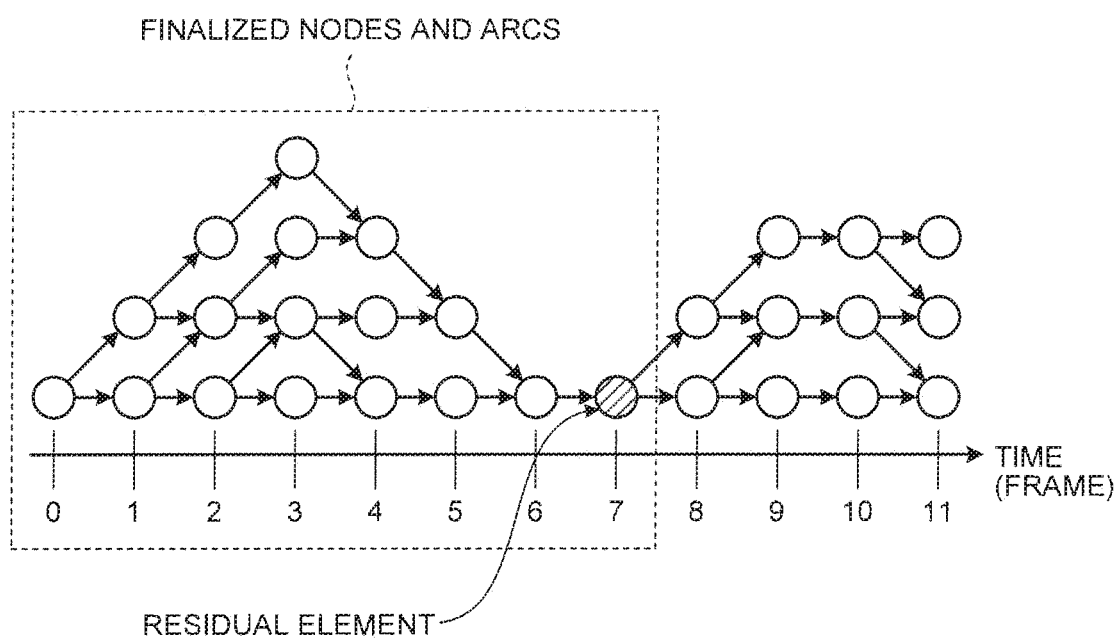
FIG. 9 is a diagram illustrating an example of finalized nodes and arcs.

Then, at Step S16, the finalizer 50 finalizes the nodes and the arcs in the paths from the start node to the splitting position in the lattice stored in the lattice storage 18. More particularly, when the residual element is a node, the finalizer 50 finalizes the nodes and the arcs in a plurality of paths from the start node to the residual element. Moreover, when the residual element is an arc, the finalizer 50 finalizes the nodes and the arcs in a plurality of paths from the start node to either the immediately preceding node to the residual element or the immediately following node to the residual element. In the present example, as illustrated in FIG. 9, the finalizer 50 finalizes all nodes and arcs in a plurality of paths from the start node in the frame having the frame number 0 to the node representing the residual element in the frame number 7.

Figure 10:
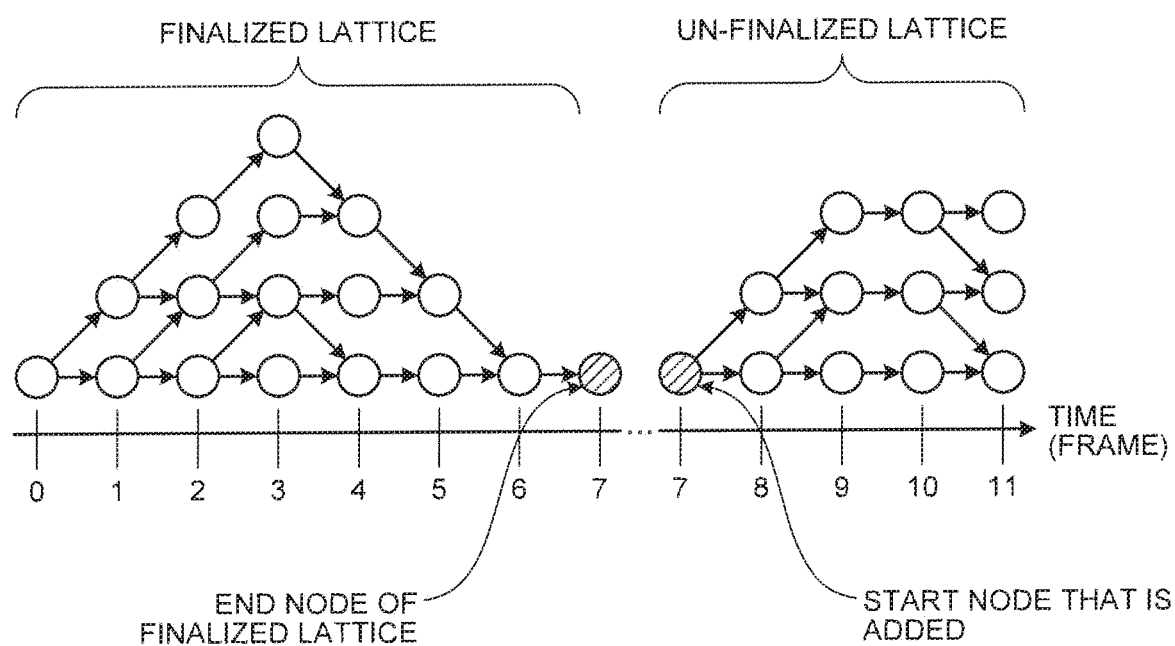
FIG. 10 is a diagram illustrating an example of splitting the lattice.

Subsequently, at Step S17, the finalizer 50 separates the finalized nodes and arcs into a new lattice isolated from the un-finalized nodes and arcs. In the present example, as illustrated in FIG. 10, the finalizer 50 registers, in a new lattice, the finalized nodes and arcs from the frame having the frame numbers 0 to 7.

Moreover, the finalizer 50 newly registers the start node in the un-finalized lattice. For example, in the present example, as illustrated in FIG. 10, the finalizer 50 adds the new start node corresponding to the frame number 7 in the un-finalized lattice. Then, regarding the arc representing the transition from the node corresponding to the frame number 7 to the node in the frame having the frame number 8, the finalizer 50 sets the immediately preceding node as the newly-added start node.

Subsequently, at Step S18, the finalizer 50 outputs the new lattice, which has been separated and already finalized, to the output unit 22. After outputting the already-finalized new lattice, the finalizer 50 deletes that new lattice from the lattice storage 18. When the operation at Step S18 is completed, it marks the end of the flow of operations performed in the lattice finalization device 20.

Figure 11:
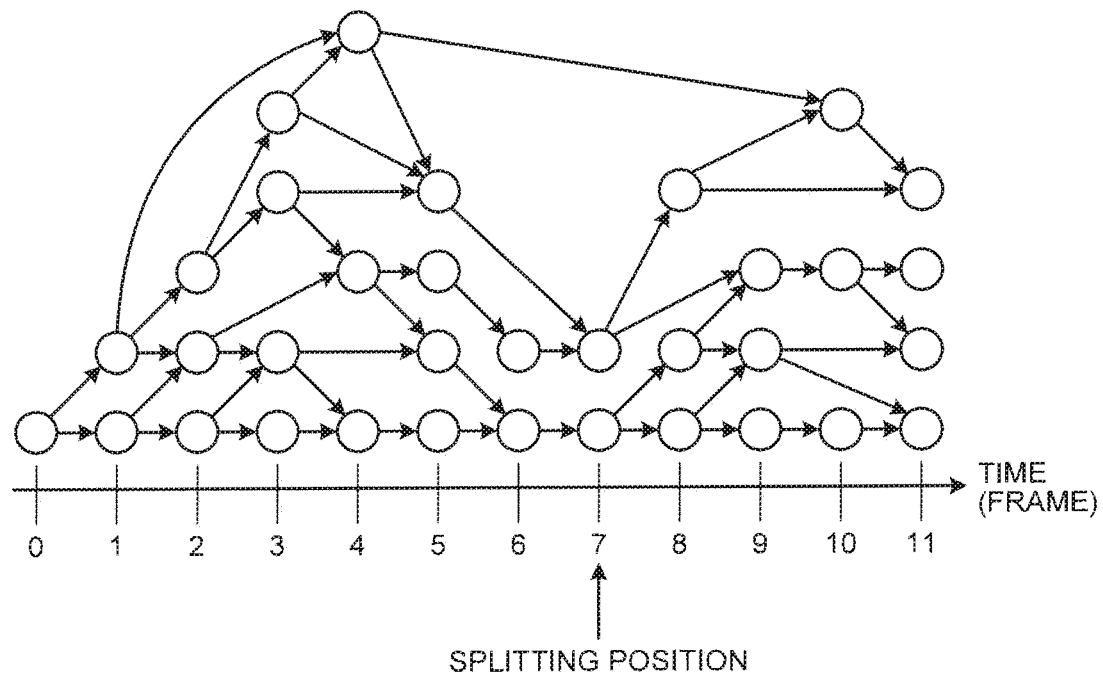
FIG. 11 is a diagram illustrating an example of a word lattice and the splitting position.

FIG. 11 is a diagram illustrating an example of a word lattice generated by the decoder 16. The decoder 16 can generate a lattice (a word lattice) that, as illustrated in FIG. 11, includes arcs representing the transition between the nodes of two frames over a wider range than two successive frames.

In that case, the detector 44 calculates the frame-by-frame total of the number of nodes and the number of passing arcs, and detects a frame having the total to be equal to or smaller than a reference value as the splitting position. For example, in the word lattice illustrated in FIG. 11, the total of the number of nodes and the number of passing arcs is 1, 2, 4, 6, 6, 5, 4, 3, 5, 6, 6, and 4 in order starting from the frame number 0. If the reference value is set to 3, the detector 44 detects the frame having the frame number 7 as the splitting position.

For example, using Equation (1) given below, the detector 44 calculates a frame-by-frame total value w of the number of nodes and the number of passing arcs.

$$w(f) = |\{e \in E | t(p(e)) < f \wedge f < t(n(e))\}| + |\{q \in Q | t(q) = f\}| \quad (1)$$

Herein, f represents the frame number. Moreover, q represents a node. Furthermore, Q represents the set of nodes q included in the lattice. Moreover, e represents an arc. Furthermore, E represents the sets of arcs e included in the lattice. Moreover, t(q) represents the frame number corresponding to the node q. Furthermore, p(e) represents the immediately preceding node to the arc e. Moreover, n(e) represents the immediately following node to the arc e.

The arc e passing through the frame having the frame number f represents an arc for which the immediately preceding node corresponds to the frame previous to the frame having the frame number f and for which the immediately following node corresponds to the frame subsequent to the frame having the frame number f. Thus, the arc e that passes through the frame having the frame number f satisfies the condition $(t(p(e)) < f) \wedge (f < t(n(e)))$. Hence, in Equation (1), the first term represents the number of arcs e included in the set E of arcs and passing through the frame having the frame number f. Moreover, in Equation (1), the second term represents the number of nodes included in the set Q of nodes and corresponding to the frame having the frame number f. Thus, Equation (1) indicates the calculation of the total value w(f) of the number of nodes and the number of passing arcs in the frame having the frame number f.

Figures 12, 13:
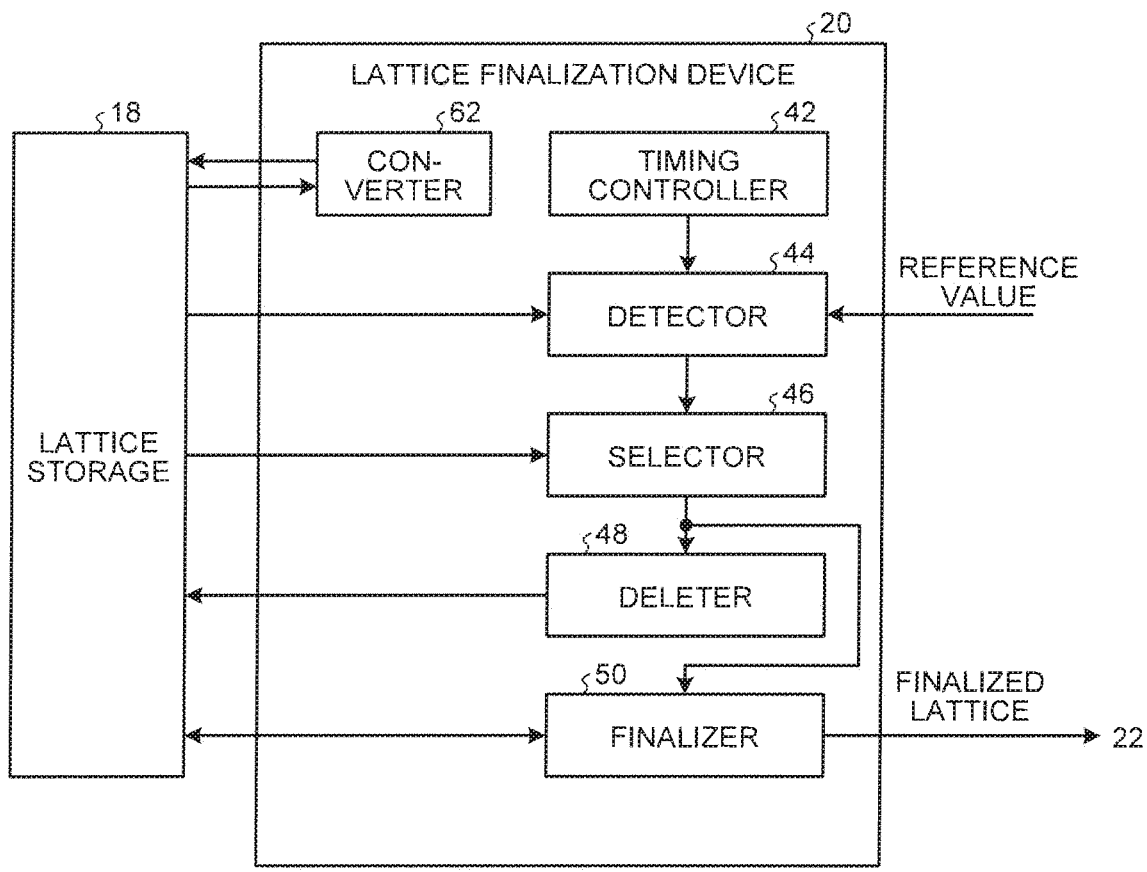
FIG. 12 is a diagram illustrating an exemplary pseudo-code representing the operations performed by the pattern recognition device.
FIG. 13 is a diagram illustrating a configuration of the lattice finalization device according to a modification example.

FIG. 12 is a diagram illustrating an exemplary pseudo-code representing the operations performed by the pattern recognition device 10. As an example, the pattern recognition device 10 sequentially executes the pseudocode illustrated in FIG. 12 in order from the first line.

The first line indicates that, while the input of signals is underway, the operations from the second line to the 11-th line are performed in a repeated manner. Thus, while the input of signals is underway, the pattern recognition device 10 performs the operations from the second line to the 11-th line in a repeated manner.

At the second line, the decoder 16 substitutes the input signal in a variable x. At the third line, the decoder 16 performs pattern recognition for a single frame with respect to the input signal.

At the fourth line, the lattice finalization device 20 determines whether or not a condition T is satisfied. The condition T represents a determination condition regarding whether or not to perform the operation of finalizing a portion of the lattice. A specific example of this condition is given in the earlier explanation about the timing controller 42. When the condition T is satisfied, the lattice finalization device 20 executes the operations from the fifth line onward. However, when the condition T is not satisfied, the lattice finalization device 20 returns to the operation at the first line.

At the fifth line, the lattice finalization device 20 detects the splitting position, and substitutes the detected splitting position in a variable $f_d$. At the sixth line, the lattice finalization device 20 determines whether or not the splitting position could be obtained. If the splitting position could be obtained, then the lattice finalization device 20 performs the operations from the seventh line onward. However, if the splitting position could not be obtained, then the lattice finalization device 20 returns to the operation at the first line.

At the seventh line, the lattice finalization device 20 performs the operation in which, from among the nodes at the splitting position or the arcs passing through the splitting position, a single residual element is selected. At the eighth line, the lattice finalization device 20 performs the operation of deleting the nodes and the passing arcs other than the residual element at the splitting position as well as deleting the nodes and the arcs that either cannot reach the residual element or do not arrive from the residual element.

At the ninth line, the lattice finalization device 20 performs the operation of finalizing the portion from the start node to the splitting position. At the 10-th line, the lattice finalization device 20 performs the operation of separating the finalized nodes and arcs into a new lattice. Then, at the 11-th line, the lattice finalization device 20 performs the operation of outputting the finalized lattice and deleting it from the lattice storage 18.

In this way, in the pattern recognition device 10 according to the embodiment, signals that are input in chronological order are subjected to pattern recognition and a lattice generated by performing pattern recognition can be finalized at an early stage.

FIG. 13 is a diagram illustrating a configuration of the lattice finalization device 20 according to a modification example along with illustrating the lattice storage 18. When the decoder 16 generates a word lattice, the lattice finalization device 20 according to the modification example converts the word lattice into a state lattice, and then performs operations. Meanwhile, the constituent elements having the substantially identical functions to the functions explained in the embodiment with reference to FIGS. 1 to 12 are referred to by the same reference numerals in the drawings, and the explanation of those constituent elements is not repeated.

The lattice finalization device 20 according to the modification example includes a converter 62 in addition to having the configuration illustrated in FIG. 4. The converter 62 reads a word lattice stored in the lattice storage 18, converts the word lattice into a state lattice, and rewrites the post-conversion state lattice in the lattice storage 18. Thus, when the decoder 16 generates a word lattice; the detector 44, the selector 46, the deleter 48, and the finalizer 50 perform operations with respect to the corresponding post-conversion state lattice.

As a result, even if the decoder generates a word lattice; the detector 44, the selector 46, the deleter 48, and the finalizer 50 can perform operations in an identical manner to the operations performed with respect to a state lattice. That is, the detector 44, the selector, the deleter 48, and the finalizer 50 need not perform the following operations: detecting the number of passing arcs, selecting a passing arc as a residual element, and finalization in the case in which the residual element is an arc. Thus, in the lattice finalization device 20 according to the modification example, it becomes possible to reduce the amount of calculation involved in the detector 44, the selector 46, the deleter 48, and the finalizer 50.

Alternatively, the lattice finalization device 20 can perform the operation of detecting the splitting position based on the post-conversion state lattice; but can perform the other operations, other than the operation of detecting the splitting position, with respect to the pre-conversion word lattice. In that case, the detector 44 performs operations with respect to the post-conversion state lattice. However, the selector 46, the deleter 48, and the finalizer 50 perform operations with respect to the pre-conversion word lattice.

Figures 14, 15:
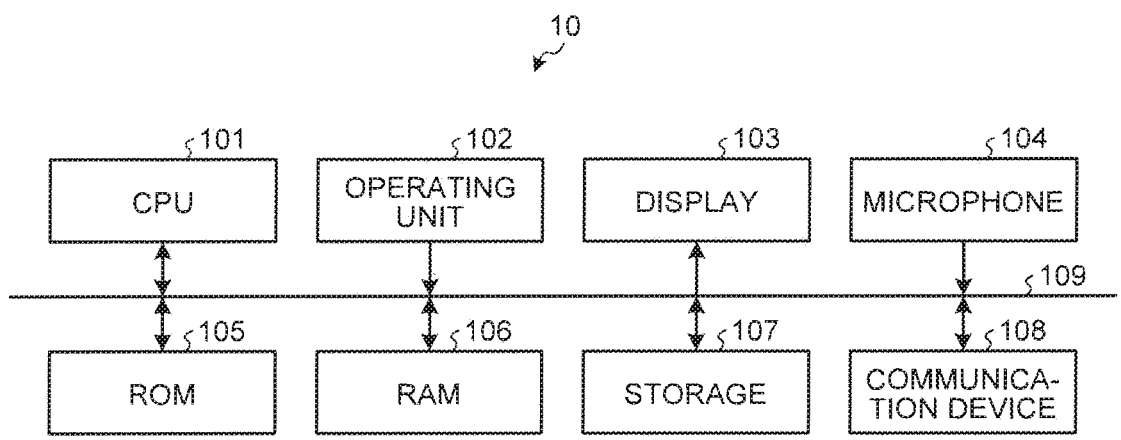
FIG. 14 is a diagram illustrating an exemplary pseudo-code representing the operations performed by a converter according to the modification example.
FIG. 15 is a hardware block diagram of the pattern recognition device.

FIG. 14 is a diagram illustrating an exemplary pseudocode representing the operations performed by the converter 62 of the lattice finalization device 20 according to the modification example. As an example, the converter 62 sequentially executes the pseudocode illustrated in FIG. 14 in order from the 101-st line.

Firstly, at the 101-st line, the converter 62 replicates, in a set $E_W$, all arcs e included in the set E of arcs of the pre-conversion word lattice. The 102-nd line indicates that the operations from the 103-rd line to the 110-th line are performed for all arcs e included in the set $E_W$. Thus, the converter 62 performs the operations from the 103-rd line to the 110-th line for all arcs e included in the set $E_W$.

At the 103-rd line, the converter 62 substitutes the node p(e), which is immediately preceding the arc e, into a variable $q_p$. The 104-th line indicates that, regarding a variable i, the operations from the 105-th line to the 108-th line are performed for each integer from 1 to (t(n(e))−t(p(e))−1) representing the variable i. Thus, the converter 62 performs the operations from the 105-th line to the 108-th line for each integer from 1 to (t(n(e))−t(p(e))−1) representing the variable i.

At the 105-th line, the converter 62 generates a new node q. At the 106-th line, the converter 62 generates a new arc e'. Moreover, the converter 62 substitutes the variable $q_p$ in a node p(e') that is the immediately preceding node to the new arc e'. Furthermore, the converter 62 substitutes the node q in a node n(e') that is the immediately following node to the new arc e'. At the 107-th line, the converter 62 substitutes t(p(e))+i in the frame number t(q).

At the 108-th line, the converter 62 adds the new node q in the set Q of nodes. Moreover, the converter 62 adds the new arc e' to the set E of arcs. Furthermore, the converter 62 substitutes the new node q in the variable $q_p$.

At the 109-th line, the converter 62 generates the new arc e'. Moreover, the converter 62 substitutes the variable $q_p$ in the node p(e') that is the immediately preceding node to the new arc e'; substitutes the node n(e) in the node n(e') that is the immediately following node to the new arc e'; and substitutes a label string l(e) of the arc e in a label string l(e') of the new arc e'. Meanwhile, in the case in which a word lattice is converted into a state lattice only for the purpose of detecting the splitting position, the converter 62 need not perform the operation of substituting the label string l(e) in the label string l(e') at the 109-th line.

At the 110-th line, the converter 62 removes the arc e from the set E of arcs and adds the new arc e' to the set E of arcs. As a result of performing the operations described above, the converter 62 can convert the word lattice into a state lattice.

FIG. 15 is a hardware block diagram of the pattern recognition device 10. As an example, the pattern recognition device 10 is implemented using a hardware configuration identical to a general-purpose computer (an information processing device). The pattern recognition device 10 includes a central processing unit (CPU) 101, an operating unit 102, a display 103, a microphone 104, a read only memory (ROM) 105, a random access memory (RAM) 106, a storage 107, a communication device 108, and a bus 109. Herein, the constituent elements are connected to each other by the bus 109.

The CPU 101 uses the RAM 106 as the work area, and performs various operations in cooperation with various computer programs stored in advance in the ROM 105 or the storage 107; and comprehensively controls the operations of the constituent elements (the segment detection device 12, the decoder 16, the lattice finalization device 20, and the output unit 22) of the pattern recognition device 10. Moreover, in cooperation with computer programs stored in advance in the ROM 105 or the storage 107, the CPU 101 implements the operating unit 102, the display 103, the microphone 104, and the communication device 108.

The operating unit 102 is an input device such as a mouse or a keyboard that receives, as instruction signals, information input by the user, and outputs the instruction signals to the CPU 101.

The display 103 is a display device such as a liquid crystal display (LCD). Herein, the display 103 displays a variety of information based on display signals sent from the CPU 101. For example, the display 103 displays lattices or label strings output by the output unit 22. Meanwhile, in the case in which lattices or label strings are to be output to the communication device 108 or the storage 107, the pattern recognition device 10 may not include the display 103.

The microphone 104 is a device for inputting speech signals. However, in the case of performing pattern recognition with respect to speech signals registered in advance or speech signals input from the communication device 108 or in the case of performing pattern recognition with respect to signals not representing speech, the pattern recognition device 10 may not include the microphone 104.

The ROM 105 is used to store, in a non-rewritable manner, the computer programs and a variety of information used in controlling the pattern recognition device 10. The RAM 106 is a volatile memory medium such as a synchronous dynamic random access memory (SDRAM). Moreover, the RAM 106 serves as the work area of the CPU 101. More particularly, the RAM 106 serves as a buffer for temporarily storing various variables and parameters used in the pattern recognition device 10. Besides, the RAM 106 can also be used to store the information stored in the lattice storage 18.

The storage 107 is a rewritable recording device such as a semiconductor memory medium, for example, a flash memory, or a memory medium in which information can be recorded in magnetic or optical manner. Herein, the storage 107 is used to store computer programs and a variety of setting information used in controlling the pattern recognition device 10. Moreover, the storage 107 is used to store information that is stored in the model storage 14 and the lattice storage 18.

The communication device 108 is used to communicate with external devices and output lattices or label strings. However, in the case of performing pattern recognition with respect to speech signals registered in advance or speech signals input from the microphone 104 and outputting lattices or label strings to the display 103 or the storage 107, the pattern recognition device 10 may not include the communication device 108.

Meanwhile, in the case of performing pattern recognition with respect to handwritten characters, the pattern recognition device 10 further includes a handwriting input device. Moreover, in the case of performing optical character recognition (OCR), the pattern recognition device 10 further includes a scanner or a camera. Furthermore, in the case of performing gesture recognition, hand signal recognition, or sign language recognition; the pattern recognition device 10 further includes a video camera for receiving input of moving image signals. In such types of pattern recognition in which a speech is not used, the pattern recognition device 10 may not include the microphone 104.

The computer programs executed in the pattern recognition device 10 according to the embodiment are recorded as installable or executable files in a computer-readable recording medium which may be provided as a computer program product, such as a compact disk read only memory (CD-ROM), a flexible disk (FD), a compact disk recordable (CD-R), or a digital versatile disk (DVD).

Alternatively, the computer programs executed in the pattern recognition device 10 according to the embodiment can be saved as downloadable files on a computer connected to the Internet or can be made available for distribution through a network such as the Internet. Still alternatively, the computer programs executed in the pattern recognition device 10 according to the embodiment can be stored in advance in a ROM.

The computer programs executed in the pattern recognition device 10 according to the embodiment contain modules for implementing the segment detection device 12, the decoder 16, and the lattice finalization device 20 (the timing controller 42, the detector 44, the selector 46, the deleter 48, the finalizer 50, and the converter 62). The CPU 101 (processor) reads the computer programs from a memory medium and executes them, so that the segment detection device 12, the decoder 16, and the lattice finalization device 20 (the timing controller 42, the detector 44, the selector 46, the deleter 48, the finalizer 50, and the converter 62) are loaded and generated in a main memory device. Meanwhile, some or all of the segment detection device 12, the decoder 16, and the lattice finalization device 20 can be alternatively configured using hardware.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A lattice finalization device comprising:
   one or more hardware processors configured to:
   generate a lattice including a plurality of nodes and a plurality of arcs sequentially from a temporally first frame by performing pattern recognition with respect to a component of a corresponding frame in time-series signals for each of a plurality of frames representing times at predetermined intervals, each of the plurality of nodes being associated with one of the plurality of frames and representing a state of a signal at the associated frame, each of the plurality of arcs representing a transition between two nodes among the plurality of nodes;
   detect, as a splitting position, a frame for which a total number of associated one or more nodes and one or more passing arcs is equal to or smaller than a reference value that is set by a user in advance, wherein with respect to the one or more passing arcs, an immediately preceding node corresponds to a temporally anterior frame than the frame and an immediately following node corresponds to a temporally posterior frame than the frame;
   select, from among one or more nodes associated with the splitting position or one or more passing arcs that pass through the splitting position, a single node or a single arc as a residual element; and
   finalize, when the residual element is a node, nodes and arcs in a plurality of paths from a start node to the residual element, and finalize, when the residual element is an arc, nodes and arcs in a plurality of paths from the start node to an immediately preceding node of the residual element or to an immediately following node of the residual element, wherein
   the start node is
   a node corresponding to the temporally first frame in the lattice when a portion of the lattice is not finalized, and
   a node corresponding to a temporally rearmost frame among lastly finalized nodes in the lattice when a portion of the lattice is finalized one time or more.

2. The device according to claim 1, wherein the hardware processors
   detect, from among a plurality of paths from the start node to an end node in the lattice, a single path having a best score that represents a degree of coincidence with signals, and
   select, as the residual element, a node at the splitting position or an arc passing through the splitting position in the single detected path.

3. The device according to claim 1, wherein the hardware processors
   detect, from among a plurality of paths from the start node to the splitting position in the lattice, a single path having a best score that represents a degree of coincidence with signals, and
   select, as the residual element, a node at the splitting position or an arc passing through the splitting position in the single detected path.

4. The device according to claim 1, wherein the hardware processors
   detect, from among a plurality of paths from the start node to a specified frame from among frames between the splitting position and an end node in the lattice, a single path having a best score that represents a degree of coincidence with signals, and
   select selects, as the residual element, a node at the splitting position or an arc passing through the splitting position in the single detected path.

5. The device according to claim 1, wherein the hardware processors
   detect, from among one or more nodes associated with the splitting position or one or more passing arcs that pass through the splitting position, a single node or a single arc having most number of branches up to one or more end nodes in paths, and
   select, as the residual element, the single detected node or arc.

6. The device according to claim 1, wherein, from the start node to an end node, when there is more than one frame for which the total number is equal to or smaller than the reference value, the hardware processors detect, as the splitting position, a temporally rearmost frame.

7. The device according to claim 1, wherein the hardware processors detect, as the splitting position, a frame positioned after a predetermined number of frames from the start node.

8. The device according to claim 1, wherein the hardware processors are further configured to
   delete, from among one or more nodes associated with the splitting position or one or more passing arcs that pass through the splitting position and from the lattice, a node and a passing arc which do not represent the residual element and delete a node and an arc which are not able to reach the residual element and which correspond to temporally anterior frames to the splitting position.

9. The device according to claim 1, wherein the hardware processors are further configured to, from the lattice, delete a node and a passing arc at the splitting position which do not represent the residual element and delete a node and an arc which are not able to arrive from the residual element and which correspond to temporally posterior frames to the splitting position.

10. The device according to claim 1,
    wherein the hardware processors are further configured to determine a timing for performing an operation of finalizing a portion of the lattice,
    wherein while the pattern recognition is underway, the hardware processors perform the operation of finalizing a portion of the lattice.

11. The device according to claim 10, wherein, the hardware processors perform the operation of finalizing a portion of the lattice at the time of performing a pruning operation during the pattern recognition.

12. The device according to claim 1, wherein the hardware processors
    separate finalized nodes and arcs into a new lattice isolated from un-finalized nodes and arcs, and
    newly register the start node in the lattice that is not finalized.

13. The device according to claim 12, wherein the hardware processors output the new lattice that is separated and deletes the new lattice after outputting.

14. The device according to claim 1, wherein
    in the lattice, all arcs represent a transition between nodes of two successive frames, and
    the hardware processors detect, as the splitting position, a single frame for which the number of one or more nodes associated with the splitting position is equal to or smaller than the reference value.

15. The device according to claim 1, wherein
    the lattice includes arcs representing a transition between nodes of two frames over a wider range than two successive frames.

16. A lattice finalization method comprising:
    generating a lattice including a plurality of nodes and a plurality of arcs sequentially from a temporally first frame by performing pattern recognition with respect to a component of a corresponding frame in time-series signals for each of a plurality of frames representing times at predetermined intervals, each of the plurality of nodes being associated with one of the plurality of frames and representing a state of a signal at the associated frame, each of the plurality of arcs representing a transition between two nodes among the plurality of nodes;
    detecting, as a splitting position, a frame for which a total number of associated one or more nodes and one or more passing arcs is equal to or smaller than a reference value that is set by a user in advance, wherein with respect to the one or more passing arcs, an immediately preceding node corresponds to a temporally anterior frame than the frame and an immediately following node corresponds to a temporally posterior frame than the frame;
    selecting, from among one or more nodes associated with the splitting position or one or more passing arcs that pass through the splitting position, a single node or a single arc as a residual element; and
    finalizing, when the residual element is a node, nodes and arcs in a plurality of paths from a start node to the residual element, and finalizing, when the residual element is an arc, nodes and arcs in a plurality of paths from the start node to an immediately preceding node of the residual element or to an immediately following node of the residual element, wherein
    the start node is
    a node corresponding to the temporally first frame in the lattice when a portion of the lattice is not finalized, and
    a node corresponding to a temporally rearmost frame among lastly finalized nodes in the lattice when a portion of the lattice is finalized one time or more.

17. A computer program product comprising a non-transitory computer-readable medium containing a program executed by a computer, the program causing the computer to execute:
    generating a lattice including a plurality of nodes and a plurality of arcs sequentially from a temporally first frame by performing pattern recognition with respect to a component of a corresponding frame in time-series signals for each of a plurality of frames representing times at predetermined intervals, each of the plurality of nodes being associated with one of the plurality of frames and representing a state of a signal at the associated frame, each of the plurality of arcs representing a transition between two nodes among the plurality of nodes;
    detecting, as a splitting position, a frame for which a total number of associated one or more nodes and one or more passing arcs is equal to or smaller than a reference value that is set by a user in advance, wherein with respect to the one or more passing arcs, an immediately preceding node corresponds to a temporally anterior frame than the frame and an immediately following node corresponds to a temporally posterior frame than the frame;
    selecting, from among one or more nodes associated with the splitting position or one or more passing arcs that pass through the splitting position, a single node or a single arc as a residual element; and
    finalizing, when the residual element is a node, nodes and arcs in a plurality of paths from a start node to the residual element, and finalizing, when the residual element is an arc, nodes and arcs in a plurality of paths from the start node to an immediately preceding node of the residual element or to an immediately following node of the residual element, wherein
the start node is
a node corresponding to the temporally first frame in the lattice when a portion of the lattice is not finalized, and
a node corresponding to a temporally rearmost frame among lastly finalized nodes in the lattice when a portion of the lattice is finalized one time or more.

* * * * *